United States Patent [19]

Anthony

[11] 4,407,528

[45] Oct. 4, 1983

[54] HIGH PRESSURE INSULATING FLANGE

[75] Inventor: Donald R. Anthony, Plano, Tex.

[73] Assignee: Atlantic Richfield Company, Los Angeles, Calif.

[21] Appl. No.: 330,112

[22] Filed: Dec. 14, 1981

[51] Int. Cl.³ .......................... F16L 11/12; F16L 9/14; F16L 33/00; H02G 15/24

[52] U.S. Cl. ........................................ 285/50; 285/55; 285/238; 138/144; 174/21 R; 174/85; 174/122 G

[58] Field of Search .................. 285/50, 53, 55, 235, 285/238, DIG. 16, 47–49; 138/144; 174/85, 121 SR, 122 G, 124 G, 124 GC, 21 R, 21 JS

[56] References Cited

U.S. PATENT DOCUMENTS

| | | | |
|---|---|---|---|
| 873,215 | 12/1907 | Davis | 174/85 X |
| 1,035,212 | 8/1912 | McCarthy | 285/53 X |
| 2,267,085 | 12/1941 | Dezendorf | 285/49 |
| 2,854,031 | 9/1958 | Donaldson | 138/144 |

FOREIGN PATENT DOCUMENTS 536846  5/1941  United Kingdom .................. 285/53

Primary Examiner—Richard J. Scanlan, Jr.
Attorney, Agent, or Firm—M. David Folzenlogen

[57] ABSTRACT

An easy to manufacture, strong, high pressure flange-type insulating coupling with wide separation between exposed metal parts is provided. The insulating coupling is made up of two metal half flanges supported on a nonconductive cylindrical nonmetallic member. The space between the two vertical ends of the half flanges is wound in typical fashion with plastic impregnated glass fibers to provide the necessary working strength.

2 Claims, 2 Drawing Figures

HIGH PRESSURE INSULATING FLANGE

BACKGROUND OF THE INVENTION

This invention pertains to insulating flanges for pipelines. More particularly, it relates to a high pressure insulating flange-like coupling made by winding plastic impregnated fiber glass on a spool formed by supporting two spaced apart metal half flanges on a nonmetallic cylinder.

In the pipeline industry, insulating couplings or flanges are used for many purposes. For example, the design, construction, operation, maintenance and salvage of metal pipelines, including flowlines and well casing, depend in part on the control of external corrosion of such tubular goods. External corrosion is caused when a pipeline is made up of metal tubular goods having different surface potentials either due to dissimilarity in metal composition or in surface newness or preparation, or when electrically connected corrosive metal tubular goods traverse different electrolytic environments, or when the electrically connected metal tubular goods pick up stray or induced electrical currents which are later discharged into the soil or water around the tubular goods. These types of external corrosion are typically controlled by disrupting the electrical circuits with insulating couplings and by cathodic protection.

Many types of insulating couplings have been proposed; but most are either unreliable for high pressure use or are hard to test because of the alternate resistance paths around the coupling. Moreover, most involve metal portions which are very close to each other and the insulated space between the metal parts is easily shorted by debris and the products of corrosion. It would, therefore, be desirable to provide a more reliable high pressure electrical insulator, especially one that provides greater separation between exposed metal parts.

SUMMARY OF THE INVENTION

A high pressure flange-like insulating coupling with wide positive separation between metal parts and its method of manufacture are disclosed. The insulating coupling has two metal half flanges mounted on a cylindrical nonmetallic, nonconductive member in a manner such that the two half flanges do not touch each other and in a manner such that the mating faces of the half flanges are pointing away from the center of the nonmetallic member. This three piece construction forms a spool-like member for winding fiber glass. This avoids the need for the mandrel winding steps normally used in forming fiberglass joints. The central portion of the spool between the two vertical portions of the half flanges is wound with plastic impregnated glass fibers until the necessary working strength is obtained. During manufacture, the plastic resin is cured in a typical fashion. This insulating coupling configuration allows a number of insulating couplings to be formed simultaneously on a single elongated cylindrical nonmetallic member or on an expandable shaft. In an optional embodiment, the cylindrical nonmetallic member has a central enlarged area to assure separation of the inner ends of the half flanges.

DETAILED DESCRIPTION OF THE PREFERRED EMBODIMENTS

Figure 1:
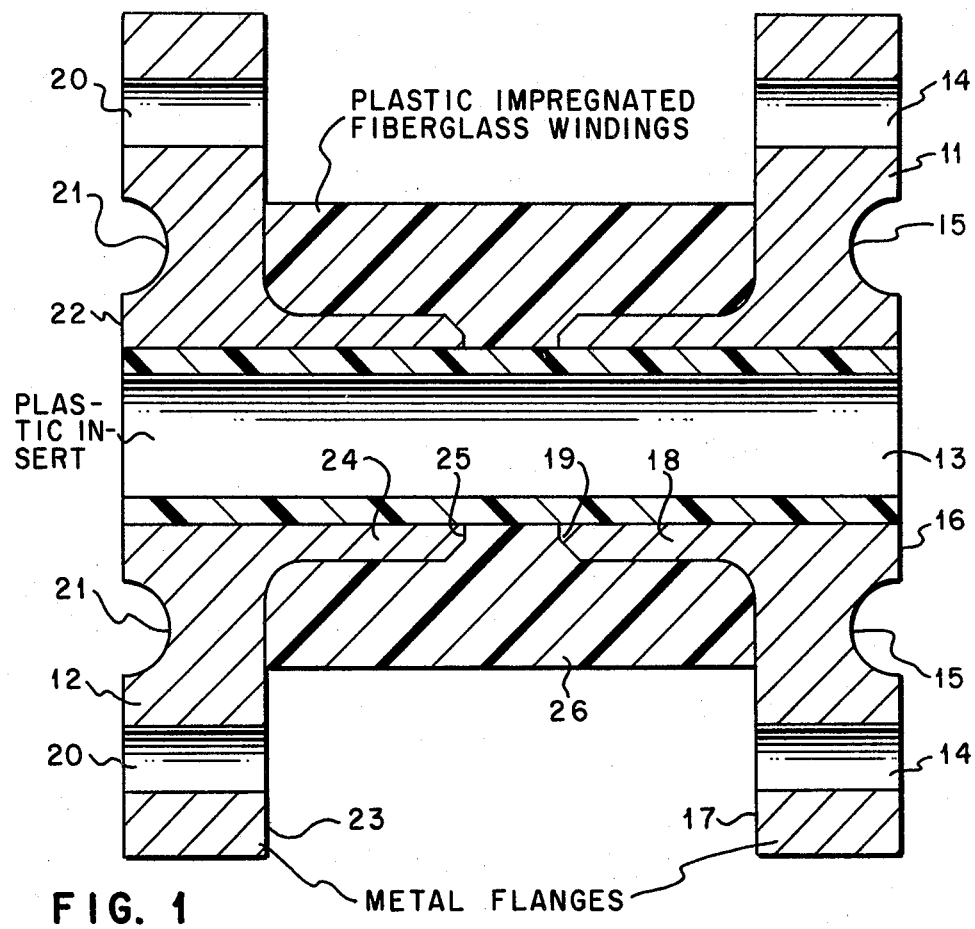
FIG. 1 is a side longitudinal cross-sectional view of a high pressure flange-like insulating coupling formed in the manner covered by this disclosure.

The high pressure insulating coupling shown in FIG. 1 has metal half flange members 11 and 12 supported on nonconductive cylindrical nonmetallic member 13. The nonmetallic member may be made of any suitable electrically nonconductive, nonmetallic material. Shown is a plastic cylindrical member. The half flanges may be any sort of metal flange which has the necessary strength for the intended pipeline application. Shown are ring-joint, welding neck flanges which have bolt holes 14 and 20 respectively and ring grooves 15 and 21 respectively. But it is to be understood that any type of flange may be used, for example, male-female flanges and tongue-and-groove flanges. Since half flanges are frequently purchased in the matching pairs, it is preferred that half flanges 11 and 12 be a matching pair so that they will fit with their respective counterpart flange ends of the pipeline (not shown).

The vertical portion of half flange 11 has mating or outer face surface 16 and inner vertical face surface 17. Half flange 11 also has inner tubular extension 18 which has inner end 19. In a similar fashion, the vertical portion of half flange 12 has mating or outer face surface 22 and inner vertical face 23. Half flange 12 also has inner tubular extension 24 which has inner end 25.

The half flanges are supported on cylindrical plastic member 13 in a manner such that mating outer face surfaces 16 and 22 are directed away from the center of the cylindrical nonmetallic member and are thereby ready for connection to other flange halves (not shown) on a pipeline, flowline, valve, or some other such section or member. As shown, the outer ends of cylindrical nonmetallic member 13 are flush with the outer mating face surfaces of half flanges 11 and 12; but this is not necessary. Cylindrical nonmetallic member 13 is primarily used for supporting and orienting the half flanges. It will usually not be strong enough to withstand the working pressure of the pipeline in which the insulating coupling is used. It, therefore, is preferred that cylindrical nonmetallic member 13 not extend beyond the outer face surface by a distance which would cause the end of cylindrical nonmetallic member to be subjected to the working pressure of the pipeline when the half flanges are connected into the pipeline. Moreover, since cylindrical nonmetallic member 13 is used simply for support and orientation of the half flanges, it should be noted that the plastic or nonmetallic member may be thin and not restrict flow through the metal flanges. The half flanges are supported on cylindrical nonmetallic member 13 in a manner such that inner face surface 17 of half flange 11 faces or is directed toward inner face surface 22 of half flange 12. In a similar fashion, inner tubular extension 18 points toward inner tubular extension 24; but the half flanges are located or spaced in a manner such that ends 19 and 25 do not touch each other. In other words, every part of half flange 11 is spaced or separated from every part of half flange 12.

The half flange mounting arrangement just described forms a spool-like member with an inner spool area between inner vertical face surfaces 17 and 23. As shown, this inner spool area is partially filled with plastic impregnated fiberglass windings 26. The fiberglass windings encircle inner tubular extensions 18 and 24 and the exposed outer central part of cylindrical nonmetallic member 13 between inner ends 19 and 25 of the inner extensions. Cylindrical nonmetallic member 13 and plastic impregnated fiber glass 26 thereby form a layer of plastic and fiber glass which is sufficient strength to withstand the normal working stresses and pressures of the pipeline application for the insulating coupling.

Figure 2:
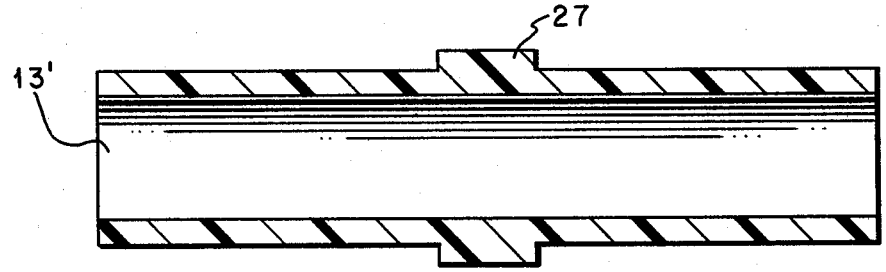
FIG. 2 is a side longitudinal cross-sectional view of a cylindrical nonmetallic member having an enlarged central portion.

FIG. 2 shows an optional embodiment of the cylindrical nonmetallic member. In this embodiment, cylindrical nonmetallic, nonconductive member 13' has enlarged central portion 27 which has a circular cross section and has an outside diameter greater than the outside diameter of the remainder of the cylindrical nonmetallic member. Enlarged central portion 27 is adapted to prevent inner end 19 of inner tubular extension 18 from touching or coming in electrical metal contact with inner end 25 of inner tubular extension 24. It is preferred that enlarged portion 27 be circumferentially continuous and of circular cross section as this facilitates proper winding of plastic impregnated fiber glass 26.

The strong, high pressure insulating coupling is manufactured by rigidly mounting metal half flanges 11 and 12 on cylindrical nonmetallic member 13. Any number of methods of mounting, orienting and spacing the half flanges may be used provided that every part of each of the half flanges is spaced from every part of the other half flange and mating outer face surfaces 16 and 22 are directed away from the center of the cylindrical nonmetallic member between the two half flanges. This arrangement of half flanges on the cylindrical nonmetallic member forms an inner spool area between vertical inner face surfaces 17 and 23. Plastic impregnated fiber glass is wound around this spool portion and the plastic impregnated fiberglass windings are cured to completed formation of the flange-type insulating coupling.

Rigid mounting may be accomplished in any typical fashion, for example, by first heating the flanges so that they easily slip onto the nonmetallic cylinder, or by using a tapered cylinder, or by sealing cement. The use of sealing cement is preferred since it would prevent crevice corrosion at the junction between the outer surface of cylindrical nonmetallic member 13 and the inner surface of the half flange inner extensions 18 and 24. The half flanges may be spaced in any desired manner, for example, if a series of half flanges is installed on one elongated cylindrical nonmetallic member, spacer rings or bars may be used and individual couplings formed by cutting the cylindrical nonmetallic member flush with the mating outer faces, with or without reaming of the end of the nonmetallic cylinder. If nonmetallic cylindrical member 13' is used, the half flanges will be separated and spaced by enlarged portion 27. If this latter arrangement is used and it is desired to wind more than one coupling at a time, a series spool-like arrangement may be mounted on an expandable shaft.

Any conventional glass winding process may be used provided that it produces a strong enough layer of cured plastic impregnated fiber glass. Continuous and discontinuous glass winding or laying machinery are available in a variety of forms. This machinery is capable of producing a variety of glass laminate or fiber constructions which have the necessary circumferential and longitudinal strengths. Filament or tape winding with specifically oriented rovings gives the most predictable strength. Such winds are usually either biaxial or helical. Discontinuous winding machinery is capable of providing a combination of the two types of windings. Biaxial winds use plastic or resin impregnated glass fiber rovings in both the circumferential and longitudinal direction to give the required strength in both directions. Helical winds use plastic or resin impregnated glass fiber rovings wound at a controlled helix angle in each direction. The helical winds provide components of both longitudinal and circumferential strength. Additional thickness or abrasion resistance may be provided, if desired, by incorporating inner or outer layers of smooth resin rich surfaces reinforced with glass, polyester or acrylic fibers or sand. A wide range of plastic thermosetting resins or mixtures of resins may be used. Polyesters, vinyl esters and epoxy resins are the most common. During winding, the glass fiber rovings are usually fed from creels with bobbins controlled to achieve even and accurate tension. Resin impregnation of the rovings is typically achieved by passing the rovings through a resin bath or saturated brush or by passing the rovings over a roller rotating in a bath of resin. The bath is usually fed by a variable output pump controlled by a level sensing device in the bath.

In any event, the spool between the vertical face portions of the half flanges is wound with plastic impregnated fiber glass until the fiber glass windings will be capable of withstanding both the internal and external pressure loads as well as the necessary tensile and compressive strength. After winding, the plastic resin is cured in any conventional fashion. For example, the resin usually contains suitable catalyst and accelerators which produce a cured product at room temperature in some twenty to thirty minutes after completion of the winding process. The curing is exothermic and may raise the temperature of the curing resin to about 100° F. Usually infra-red heaters are used to raise the temperature to about 120° to 140° F. For additional control, a hot air post cure is frequently included, for example, a hot air stove operated at 250° F. may be used.

Reasonable variations and modifications are practical within the scope of this disclosure without departing from the spirit and scope of the claimed invention.

The embodiments of the invention in which an exclusive property or privilege is claimed are defined as follows:

1. A high pressure insulating coupling for use in a pipeline comprised of two metal half flanges, each of said half flanges having an outer face surface, an inner face surface, and an inner tubular extension, said half flanges being supported on a nonconductive cylindrical nonmetallic member in a manner such that the inner faces of said half flanges face each other and the inner tubular extensions point toward each other without touching each other, and plastic impregnated fiberglass windings around said inner tubular extensions between said inner face surfaces of said half flanges, said fiberglass windings and said cylindrical nonmetallic member forming a layer between said inner tubular extensions of sufficient thickness to withstand the working pressure of said pipeline.

2. The insulating coupling of claim 1 wherein said cylindrical nonmetallic member has an enlarged central portion having an outside diameter greater than the outside diameter of the remainder of said cylindrical nonmetallic member, said enlarged central portion being adapted to prevent said inner tubular extensions of said two half flanges from touching each other.

* * * * *